B. S. HYERS.
CORN AND COTTON STALK CHOPPER.
No. 176,960. Patented May 2, 1876.
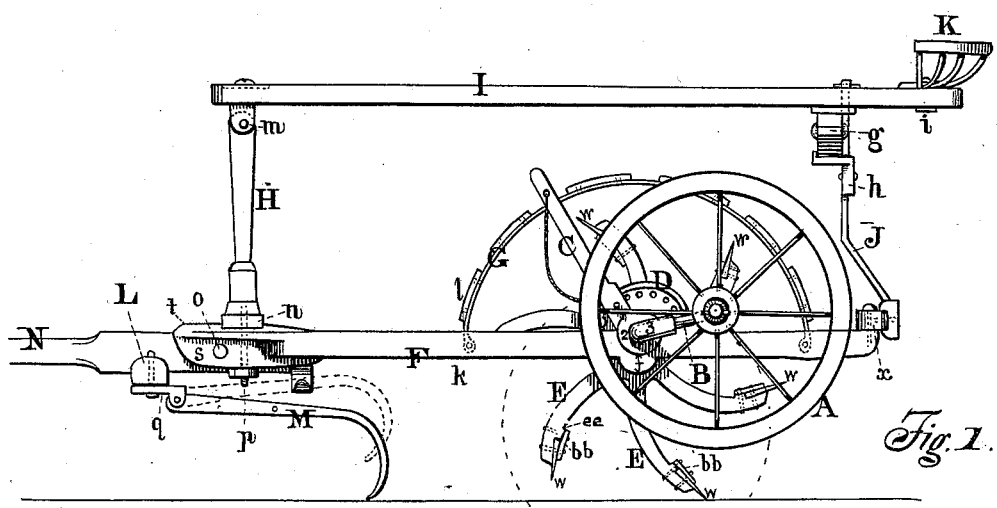
Fig. 1.
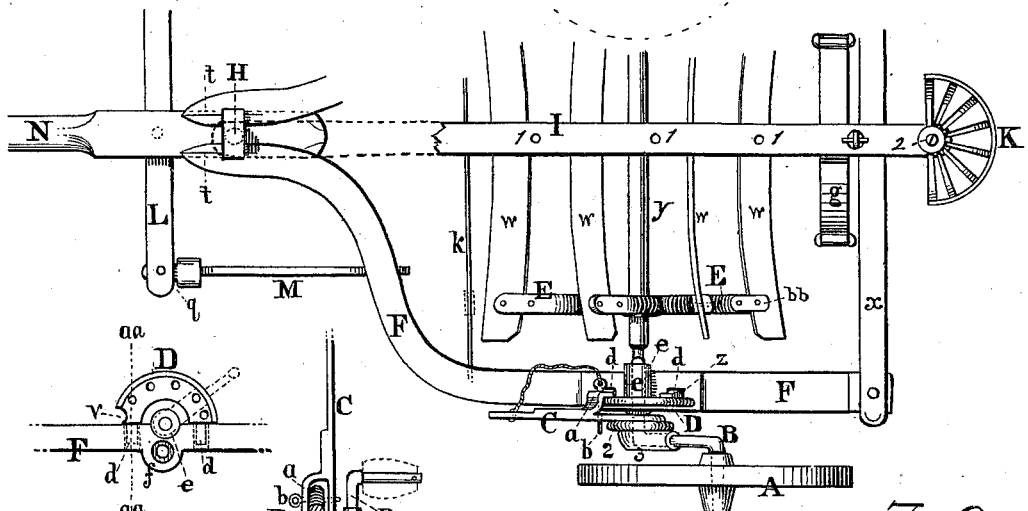
Fig. 2.
(With the Guard "G" left off.)
Fig. 3.
Elevation of Axle-boxes & Axle Lock.
Fig. 4.
(Cross-sec. on line "aa" fig. 3.)
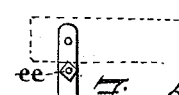
Fig. 5.
Fig. 6.
Witnesses
John Absolm
Amasa J. Green
Benjamin S. Hyers
by E. Thornton his
Atty in fact

UNITED STATES PATENT OFFICE.

BENJAMIN S. HYERS, OF PEKIN, ILLINOIS.

IMPROVEMENT IN CORN AND COTTON STALK CHOPPERS.

Specification forming part of Letters Patent No. 176,960, dated May 2, 1876; application filed October 12, 1875.

*To all whom it may concern:*

Be it known that I, BENJAMIN S. HYERS, of the city of Pekin, in the county of Tazewell, in the State of Illinois, have invented an Improvement in Corn and Cotton Stalk Cutters; and do hereby declare that the following is a full, clear, and exact description thereof, reference being had to the annexed drawings, making a part of this specification, in which like letters of reference refer to like parts, and in which—

Figure 1 is a longitudinal elevation; Fig. 2, a plan of half of the machine; Fig. 3, a side elevation of combined crank and axle locking device as attached to the hounds; Fig. 4, vertical cross-section of same, along dotted line *a a a a*, Fig. 3, including cross-section of the hound, &c.; Fig. 5, diagram of teat or blade-bearing of cutter-arm E; Fig. 6, a side view of arm, blade, teat, and fastening-plate.

This invention consists, first, in the combination of the hounds, constructed in separate pieces, and provided each with axle-boxes, to receive the axles of the wheels and that of the cutter, with a locking mechanism, consisting of levers with attached pins, and arches or segmental plates having holes to receive the pins, whereby the wheels can be elevated to enable the blades to cut the stalks, the said levers being arranged so that they can be locked to the arches by means of the said pins, to hold the hounds; second, in the combination of a longitudinal bar, having a pivotal connection with the front post, and provided with an adjustable seat, with an elliptical spring, adjusting-bracket, and rear post, as will be hereinafter more fully explained.

This machine, as a whole, is similar in form to known stalk-cutters, consisting of a cylindrically-arranged cutter, supported on crank-axled wheels, hounds, tongue, seat, and stalk-straighteners.

In the drawings, A represents the supporting-wheels, mounted each upon a crank, B, in a well-known form, but with the elbow 3, lever-boss or hub 2, cast upon the crank B, in one piece, the inner end or axle passing through the upper axle-box *e* in the hound, and locked there, as described hereafter. C is the usual crank-lever for elevating or lowering the cutter E E, and is riveted or bolted to the inner face of the flat hub 2, and has a clasp, *a*, which clasps the edge of the locking-arch D after passing through the notch *v* in the edge of said crank-lock D, through the holes in which, and the corresponding hole in said clasp *a*, a pin, *b*, passes, to hold the hounds and cutter at desired heights. Said crank-lock D, it will be seen, acts at once as a lock to retain the crank-axle in its box, *e*, and also detains the lever C at any angle desired. It is semicircular in shape, erected on its base, upon the hounds, over the upper axle-box, and is retained by two curved tongues, *d d*, projecting from its lower edge into slots in the hound beneath, in such a manner that it must be inclined far out of perpendicular to insert the tongues in said sockets, and is kept vertical, as before described, by the clasp *a* of the lever C. E E are the arms of the cutter-heads, each curved forward to give a vertical descent to its knife *w*, the latter also having its ends curved forward, when their position in revolving is near the ground, so as to cut the stalks in the hollow as well as on the hill in their descent, which is at a right angle with the soil, and which so prevents the stalks from slipping away when the soil is soft or muddy. Each arm E has a teat, *e e*, presenting an angle against the back of the knife *w*, which angle is carefully filed away until all contact of the edges of the bolt or rivet-hole in the knife with said securing-bolt or rivet-stem is avoided, for the purpose of preventing danger of the cutting of the same by the knife. A plate, *b b*, covers said teat and part of the blade *w*, secured there by said bolt or rivets. F F are the hounds, which, if made of metal, are cast with a deep groove throughout the lower side, for lightness, and are united behind by a cross-bar, *x*, and converge in front and clasp the tongue N by means of a rectangular recess in each, and are there secured by a bolt, *o*, through the tongue. They are each cast in one piece with their respective double axle-boxes *e f*—the upper box for the wheel-axle, the lower one for the axle *y*, this box being provided with a wooden boxing within. G G represent an arched covering of boards over the cutter, supported on iron hoops and transverse rods below. H is a vertical post, having a square base, $n$, which clasps the upper ribs $t\,t$ of the hounds above the bolt $o$, and is there secured by a screw from beneath through the tongue. To the upper end of said post is pivoted, at $m$, the forward end of the seat-bar I—a horizontal bar—provided with holes 1, and to which is screwed the movable seat K, adjustable at any point along the bar by means of the said holes and center screw-bolt 2. The latter rests on a spring, $g$, attached to a sliding adjustable bracket, $h$, upon the vertical post J, rising from the rear bar $x$. L is a cross-bar under the tongue N, for breaking down the stalks, and bears at each end a universally-pivoted dragging-hook or stalk-straightener, M, of the usual form, and by means of which joint $q$ are each caused to follow their proper position when the machine is altering from a straight course.

The operation of this cutter is as follows: As is usual, the cutter is lowered to the soil by means of the levers C C, which can be locked upon the arched detents D D by means of the pin $b$. The seat K is raised or lowered adjustably by the sliding spring and bracket $g\,h$, and is shifted to points along the bar I, to accommodate the driver's weight to the action of the cutters, or to the draft upon the horses, &c. The knives are so arranged as to descend and cut vertically, whereby the stalks are not caused to slip forward.

What I claim as my invention is—

1. In a corn and cotton stalk cutter, the hounds F F, provided each with double axle-boxes $e\,f$, box $f$ being constructed to receive the axle of the revolving cutter, and box $e$ the axles of the wheel, in combination with the locking mechanism, constructed and arranged to operate in the manner as set forth.

2. The longitudinal bar I, having a pivotal connection with the post H, and provided with the seat K, adjustable by means of the holes 1 in the bar, and screw-bolt or other fastening device 2, in combination with the elliptical spring $g$, adjusting-bracket $h$, and post J, constructed and adapted substantially for the purpose as set forth.

In testimony that I claim the foregoing corn and cotton stalk cutter I have hereunto set my hand this 4th day of October, A. D. 1875.

BENJAMIN S. HYERS.

Witnesses:
G. H. KETTELLE,
JAS. M. MORSE.